May 20, 1941.  D. W. WHYTE  2,243,045
METHOD AND APPARATUS FOR MAKING BALLS
Filed Sept. 2, 1939  2 Sheets-Sheet 1

INVENTOR
David W. Whyte
BY Feyrer and Mack
ATTORNEYS

May 20, 1941.  D. W. WHYTE  2,243,045
METHOD AND APPARATUS FOR MAKING BALLS
Filed Sept. 2, 1939  2 Sheets-Sheet 2
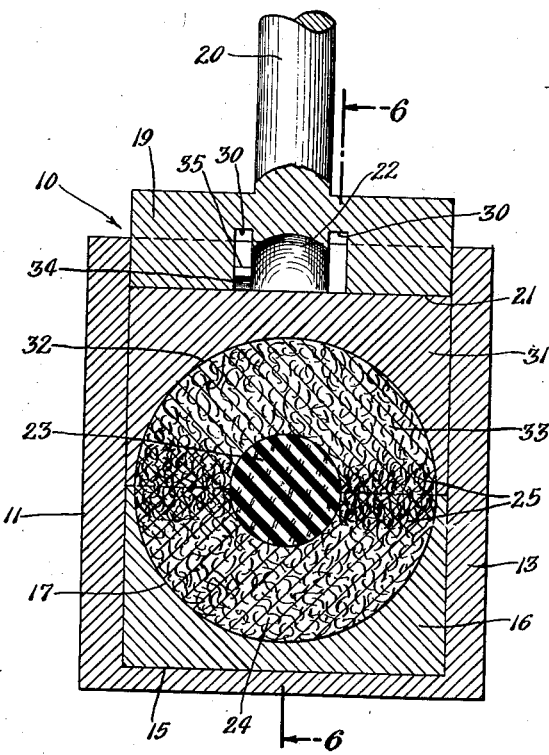
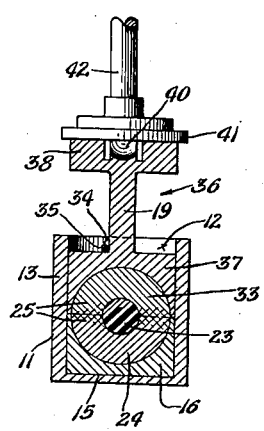
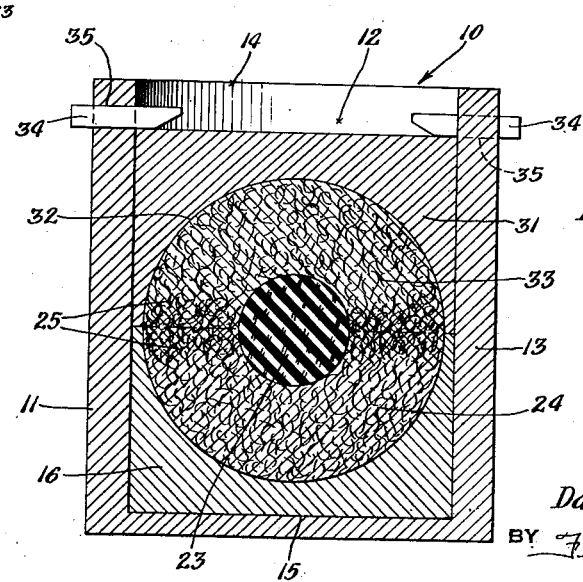
INVENTOR
David W. Whyte
BY Feyrer and Mack
ATTORNEYS Patented May 20, 1941

2,243,045

UNITED STATES PATENT OFFICE 2,243,045

METHOD AND APPARATUS FOR MAKING BALLS

David W. Whyte, Brantford, Ontario, Canada, assignor to A. G. Spalding & Bros. Inc., New York, N. Y., a corporation of Delaware Application September 2, 1939, Serial No. 293,213

20 Claims. (Cl. 154—16)

This invention relates to a method and an apparatus for making balls, particularly balls known generally as indoor baseballs or "softballs."

Balls of this nature, according to usual practice, are made by pressing a mass of fibrous material, such as kapok or the like, into a spherical shape to form a ball body which is subsequently enclosed by a suitable cover with or without an interponent of wound thread or cord between the cover and the ball body. Such balls, having a main body built up of pressed fibrous material from the geometric center to the periphery thereof have been widely used and, in general, have proved to be quite satisfactory.

However, even though the fibrous material be highly compressed, it has been found in practice that the balls so made do not maintain their desired original spherical shape a sufficiently long time and, therefore, become out of balance and difficult to handle and control. Moreover, the balls do not have the desired resiliency.

It is, therefore, an object of the present invention to provide a method and an apparatus for making a ball body which will result in the production of a ball that will maintain its original shape under very hard usage for a considerable period of time, and which will have desired qualities of resiliency.

Another and related object of the invention is to provide a method and an apparatus for most easily and effectively locating an inserting a core within the body of pressed fibrous material to maintain the ball body against adverse deformation in use.

Methods and apparatuses other than the method and apparatus forming the subject matter of the present invention, have been proposed for positioning a core in the body of a "softball." However, these prior proposals, for the most part, have proved to be relatively costly and/or to be unsatisfactory because of a failure to properly center the core in the ball body.

Another object of the present invention, therefore, is to provide a method and an apparatus for making a ball body of pressed fibrous material in a most economical manner and in which a core is most accurately centered in the ball body.

In the attainment of these and other objects of the invention there is provided as a feature of the invention a method and an apparatus by which one-half of the ball body is formed simultaneously with the pressing of a core into a predetermined position therein.

Another and related feature of the invention resides in the provision of a method and an apparatus for making a ball body which involve a locking of the core relative to the first half of the pressed ball body and of the latter relative to the cup-shaped die therefor, after the first half has been formed and the core located relative thereto and before the second half of the ball body is pressed thereon and thereagainst.

A further feature of the invention resides in the provision of a method and an apparatus for making a ball body which involve pressing a core into a first half of the ball body to simultaneously form a core-receiving recess in a predetermined position in the same and to locate the core therein, and then placing the second half of the ball body around the core and against the first half of the ball body.

Other objects and features will hereinafter appear.

In the drawings:

Fig. 5 is a sectional view of the apparatus at a stage of the method subsequent to the one illustrated in Fig. 3 and with the second cup-shaped forming die in position.

Fig. 6 is a sectional view taken on the line 6—6 of Fig. 5.

Fig. 7 is a sectional view similar to Fig. 5 but showing a modified form of the apparatus.

Figure 1:
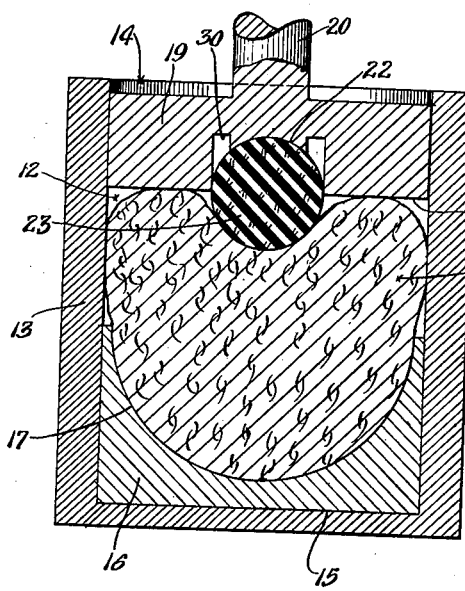
Figure 1 is a sectional view illustrating the apparatus at one stage of the method.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Referring to the drawings and first to Figs. 1–4, there is shown a mold 10 involving a base member 11 which, as illustrated, is formed with a cylindrical chamber 12 defined by a side wall 13 and having an open top 14.

Confined within the chamber 12 and resting on the bottom 15 thereof is a die 16 having a hemispherical cup-shaped recess 17 therein for receiving a mass 18 of fibrous material such as kapok or the like as shown in Fig. 1.

Mounted for movement toward and away from the die 10 in the chamber 12 is a plunger 19 which may be connected to any suitable or conventional ram of a conventional press or the like by a shank 20. Of particular importance it is to be noted that there is formed in the working face 21 of the ram a centrally located recess 22 which provides a means for locating and holding in a releasable manner a core 23 preferably of resilient material such as cork, rubber, or a cork-rubber composition.

With this construction, after a predetermined mass of kapok or the like (usually weighed) has been placed in the die 10 and after the core 23 has been inserted in the recess 22 in the plunger, or upon the mass of fibrous material near the center of the die, the plunger is moved toward the die to compress the mass of fibrous material in the chamber and die into a substantially hemispherical form and to simultaneously press the core into the mass of material in the die to form a central core receiving recess in the same and to locate the core therein. Thus a first half 24 of the ball body 25 shown in Fig. 5 is formed with a core 23 located in a predetermined central position therein and this with but a single operation.

Figure 2:
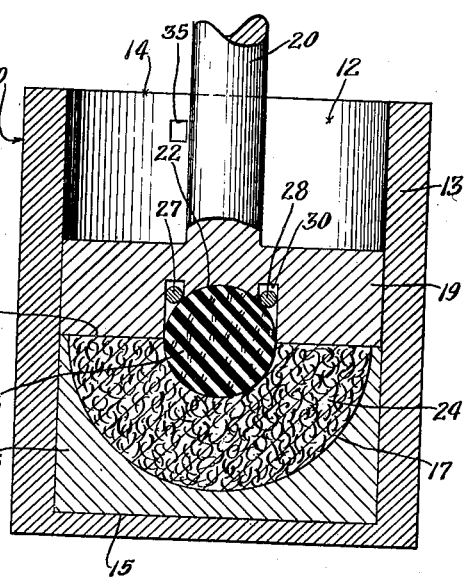
Fig. 2 is a view similar to Fig. 1 but showing the apparatus at a subsequent stage of the method and after the first half of the ball body has been formed.

The position of the plunger 19 relative to the die 10 after the completion of the operation above described is shown in Fig. 2. While the plunger is in this position and before it is withdrawn from the die a U-shaped holding member 26 having arms 27 and 28 is inserted through suitable holes 29 in the wall 13 of the base member and slots 30 formed in the plunger contiguous the recess 22, to overlie the core 23. The member 26, therefore, provides an effective means for maintaining the core relative to the first half of the ball body and for maintaining the latter relative to the die after the plunger is withdrawn as shown in Fig. 3.

Figure 3:
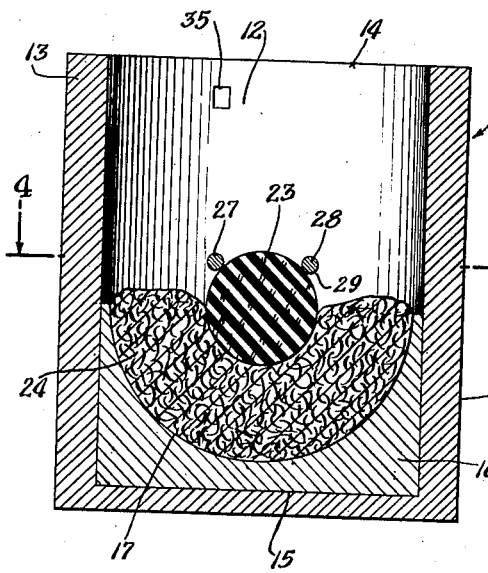
Fig. 3 is a sectional view similar to Fig. 2 but with the ram or plunger withdrawn after the first half of the ball body has been formed and the core positioned therein.
Figure 4:
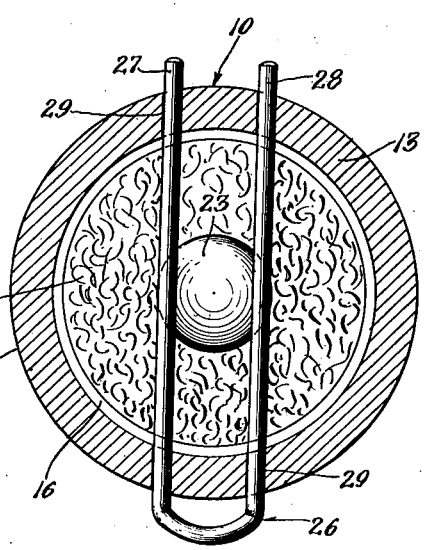
Fig. 4 is a sectional view taken on the line 4—4 of Fig. 3.

After the withdrawal of the plunger, with the core and the first half 24 of the ball body held securely in position, as shown in Fig. 3, a second predetermined mass of kapok or like fibrous material is inserted in the chamber 12, and a second die 31 having a hemispherical cup-shaped recess 32 therein, as shown in Fig. 5, is pressed downwardly in the chamber by the plunger 19 to form a second half 33 of the ball body from the second inserted mass of fibrous material and to press the same against the first half 24 of the body and around the core 23 to form the unitary ball body 25. The holding member 26 is withdrawn from the mold as the second die 31 is pressed downwardly by the plunger so that it will not interfere with the movement of the die 31 and so that fibrous material in the second mass may be closely compacted about the core.

With the second die 31 in the position shown in Fig. 5, suitable wedging members 34 are inserted through holes 35 in the side wall 13 of the base member and into the slots 30 in the plunger to overlie the die and thereby effectively lock both of the dies and the ball body 25 in the mold 10.

The mold 10 is then placed in a suitable press and heated for a sufficient period of time to cure and set the ball body so that the two halves 24 and 33 thereof will remain fixed together when the ball body is removed from the mold and so that the ball will in general maintain the spherical shape of the die. After the ball body 25 is removed from the mold a suitable cover of leather or the like may be applied thereto in the usual manner or if desired a slight winding of thread, cord, yarn, or the like may be placed on the ball body to insure the ball body being maintained in its spherical shape and to provide an interponent between the ball body and the cover when it is applied thereto.

From the above it is seen that the process utilized in forming the unitary ball body 25 involves the steps of: pressing a first mass of fibrous material into a substantially hemispherical form and simultaneously pressing a core into a predetermined position in the mass, and locking the core in position; pressing a second mass of fibrous material against the first mass and around the core to form a spherical body with a core in predetermined and accurately centered position therein, and curing the ball body under the influence of heat and pressure.

Thus, the process and the apparatus by which it is carried out are simple, require a minimum of operations, are susceptible of operation at relatively low cost and make possible the production of a unitary ball body of pressed fibrous material with a core in a predetermined and accurately centered position therein.

If desired, and as shown in Fig. 7, a slightly modified form of apparatus may be utilized in practicing the invention. Thus, instead of forming the second or upper die 31 as a member separate from the plunger 19, these two members may be formed as an integral or combined plunger and die unit 36 including a die 37 of exactly the same construction as the die 31, associated with a plunger 38 exactly like the plunger 19 by a connecting section 39 as shown in Fig. 7.

When forming the first half of the ball body the combined unit 36 is placed in a position which is the reverse of that shown in Fig. 7 with the plunger extending toward die 16. Then, after the core 23 has been properly located relative to the recess 40 in the plunger the combined unit 36 may be pressed toward the die 16 through the intermediary of any suitable plate 41 connected to the end of a conventional ram or press 42.

When forming the second half of the ball body the unit 36 is merely reversed, as shown in Fig. 7, with the die 37 extending toward the die 16 and the unit 36 then pressed toward the die 16 in the same manner as above described. In all other particulars the construction and operation of the apparatus, as shown in Fig. 7, is exactly the same as that of the apparatus shown in Figs. 1 through 6.

Variations and modifications may be made within the scope of this invention and portions of the improvements may be used without others.

Having thus described the invention, what is claimed as new is:

1. A method of making a ball including the steps of, placing a first mass of fibrous material in a first cup-shaped die; positively guiding and pressing a core into said mass to simultaneously form a core-receiving recess in a predetermined position in the same and locate the core therein, and simultaneously with the guiding and pressing of the core, compressing said first mass; and then pressing a second mass of fibrous material against said first mass and around said core with a second cup-shaped die to form a ball body with a core therein.

2. A method of making a ball including the steps of, compressing a first mass of fibrous material of predetermined weight into a substantially hemispherical form and simultaneously with said compressing of the first mass positively guiding and pressing a core into a predetermined central position in said mass; and compressing a second mass of fibrous material, of substantially the same weight as the first mass, against said first mass and around said core to form a spherical body.

3. A method of making a ball including the steps of compressing a first mass of fibrous material into a substantially hemispherical form and simultaneously with said compressing of the first mass positively guiding and pressing a core into a predetermined central position in said mass; compressing a second mass of fibrous material against said first mass and around said core to form a spherical body; and curing said spherical body under the influence of heat and pressure.

4. A method of making a ball including the steps of, compressing a first mass of fibrous material into a substantially hemispherical form and simultaneously with said compressing of the first mass positively guiding and pressing a core into a predetermined central position in said mass; compressing a second mass of fibrous material against said first mass and around said core to form a spherical body; curing said spherical body under the influence of heat and pressure; and winding cord or the like around said cured spherical body.

5. A method of making a ball including the steps of placing a first mass of fibrous material in a first cup-shaped die; pressing a core into said mass to simultaneously form a core-receiving recess in the same and locate the core therein; locking said core in said recess and relative to said first mass; and pressing a second mass of fibrous material against said first mass and around said core with a second cup-shaped die to form a ball body with a core therein.

6. A method of making a ball including the steps of placing a first mass of fibrous material in a first cup-shaped die; pressing a core into said mass to simultaneously form a core-receiving recess in the same and locate the core therein; locking said core in said recess and relative to said first mass; pressing a second mass of fibrous material against said first mass and upon said core with a second cup-shaped die to form a ball body with a core therein; and locking said dies together and subjecting said spherical body therein to heat.

7. A method of making a ball including the steps of positively guiding and pressing a core into a predetermined mass of kapok or like fibrous material confined in a die to simultaneously form a core-receiving recess in a predetermined position in said confined mass and locate the core therein, and simultaneously with the guiding and pressing of the core, compressing said first mass; then pressing a second predetermined mass of kapok or like fibrous material against said first mass and around said core with a second die to form a unitary body; and curing said body under the influence of heat and pressure.

8. An apparatus for making a ball body including a first hemispherical die for receiving a first mass of material; a plunger for pressing said mass of material in said die; means for locating a core relative to said plunger for movement therewith; and a second hemispherical die for pressing a second mass of material against said first mass and around said core to form a spherical ball body with a core therein.

9. An apparatus for making a ball body including a first shaping die, open at one end and adapted to receive a first mass of fibrous material; means movable toward and away from said die, for simultaneously pressing a core into a predetermined position in said mass and for compressing the latter in said die; means for locking said core in said predetermined position in said mass; and second shaping die adapted to press a second mass of fibrous material against said first mass and around said core in said first die to form a ball body of predetermined shape.

10. In an apparatus for forming a ball body, the combination of a shaping die having an open end and adapted to receive a mass of fibrous material; a plunger for compressing said mass in the die; and means for locating and releasably maintaining a core in a predetermined position relative to said plunger for movement therewith toward said die.

11. In an apparatus for forming a ball body, the combination of a shaping die having an open end and adapted to receive a mass of fibrous material; a plunger for compressing said mass in the die; means for locating a core in a predetermined position relative to said plunger for movement therewith toward said die; and means locking said core relative to said mass and said mass relative to said die.

12. In an apparatus for forming a ball body, the combination of a shaping die having an open end, and adapted to receive a mass of fibrous material; and a plunger movable toward said open end for compressing said mass in the die, said plunger having a recess therein centrally positioned relative to said die, for receiving and holding a core for movement therewith toward said die.

13. An apparatus for making a ball body, including a base member having a chamber; a first cup-shaped die in said chamber for receiving a first mass of fibrous material; a plunger movable toward and away from said die for pressing the material therein; means for locating a core relative to said plunger for movement with the latter to a predetermined central position relative to said die; means insertable through said base member for holding said core relative to said mass and said mass relative to said die after the plunger is moved toward said die; and a second cup-shaped die for pressing a second mass of fibrous material against said first mass and around said core to form a ball body with a centrally positioned core therein.

14. An apparatus for making a ball body, including a base member having a chamber; a first cup-shaped die in said chamber for receiving a first mass of fibrous material; a plunger movable toward and away from said die for pressing the material therein; means for locating and releasably maintaining a core relative to said plunger for movement with the latter to a predetermined central position relative to said die; a second cup-shaped die for pressing a second mass of fibrous material against said first mass and around said core to form a ball body with a centrally positioned core therein; and means for locking said first and second dies relative to each other in said chamber.

15. In an apparatus for making a ball body the combination of a shaping die having an open chamber adapted to receive a mass of material; a plunger for compressing said mass in the die; and means for maintaining a core in a predetermined position relative to said plunger for insuring a pressing of the core into a predetermined position in said mass during the compressing of the latter in said die.

16. In an apparatus for making a ball body the combination of a shaping die having an open chamber; plunger means having a core locating and holding means associated therewith, to first press and mold a first half mass of fibrous material into the shaping die to form a first half body with a core centrally located therein, and to then press and mold a second half mass of fibrous material therein and around the centrally located core to complete the ball body; and means for locking the core relative to said first half mass and said shaping die after the forming of said first half body and before the pressing of said second half mass.

17. In an apparatus for making a ball body the combination of a shaping die having an open chamber; plunger means to first press and mold half a mass of fibrous material into the shaping die to form a half body with a core centrally located therein, and to then press and mold a second half mass of fibrous material therein and around the centrally located core to complete the ball body; and means on said plunger means for locating and pressing said core into the center of the ball body during the pressing and molding.

18. A method of making a ball including the steps of compressing a first mass of fibrous material into a substantially hemispherical form and simultaneously pressing a core into a predetermined central position in said mass; locking said core in said predetermined central position and relative to said first mass; and compressing a second mass of fibrous material against said first mass and around said core to form a ball body with a core therein.

19. A method of making a ball including the steps of compressing a first mass of fibrous material into a substantially hemispherical form and simultaneously pressing a core into a predetermined central position in said mass; locking said core in said predetermined central position and relative to said first mass; compressing a second mass of fibrous material against said first mass and around said core to form a ball body with a core therein; and curing said body under the influence of heat and pressure.

20. In an apparatus for forming a ball body, the combination of a shaping die having an open end and adapted to receive a mass of fibrous material; a plunger for compressing said mass in the die; and means on said plunger for locating and pressing a core into a predetermined position in said mass during the compressing of the latter in said die.

DAVID W. WHYTE.